US009476967B2

(12) United States Patent
Nagel et al.

(10) Patent No.: US 9,476,967 B2
(45) Date of Patent: Oct. 25, 2016

(54) METHOD OF KINEMATIC RANGING (71) Applicant: Airbus Defence and Space GmbH, Ottobrunn (DE)

(72) Inventors: Dieter Nagel, Erbach (DE); Wilhelm Gruener, Ulm (DE); Christian Kulig, Ingolstadt (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 103 days.

(21) Appl. No.: 14/598,735

(22) Filed: Jan. 16, 2015

(65) Prior Publication Data
US 2015/0204967 A1  Jul. 23, 2015

(30) Foreign Application Priority Data

Jan. 17, 2014  (EP) .................................... 14000178

(51) Int. Cl.
GO1S 7/36   (2006.01)
GO1S 7/38   (2006.01)
GO1S 7/02   (2006.01)
GO1S 11/04  (2006.01)

(52) U.S. Cl.
CPC .................. G01S 7/36 (2013.01); G01S 7/021 (2013.01); G01S 7/38 (2013.01); G01S 11/04 (2013.01)

(58) Field of Classification Search
CPC ............ G01S 7/021; G01S 7/36; G01S 7/38; G01S 11/04
USPC ...................................................... 342/13–20
See application file for complete search history.

(56) References Cited

U.S. PATENT DOCUMENTS

| 4,581,767 | A | * | 4/1986 | Monsen | ................... H04K 3/42 324/613 |
| 5,278,908 | A | * | 1/1994 | Parikh | ...................... H04K 3/41 348/E7.065 |
| 5,361,073 | A | * | 11/1994 | Hansen | ..................... G01S 5/04 342/381 |
| 5,378,155 | A | * | 1/1995 | Eldridge | ................... F41G 3/26 340/988 |
| 5,483,240 | A | * | 1/1996 | Hsu | ......................... F41G 7/224 342/13 |
| 6,084,540 | A | * | 7/2000 | Yu | ............................ G01S 3/28 342/13 |

(Continued)

FOREIGN PATENT DOCUMENTS

EP   2 187 233 A1   5/2010
FR   2 923 300 A1   5/2009

OTHER PUBLICATIONS

European Search Report dated Jun. 20, 2014 (Nine (9) pages).

(Continued)

*Primary Examiner* — Peter Bythrow
(74) *Attorney, Agent, or Firm* — Crowell & Moring LLP (57) ABSTRACT A method of kinematic ranging for finding the range R of a jammer moving on a trajectory involves measuring the bearing of the jammer and the rate of change thereof using an airborne detector radar at a first position (24), causing the airborne detector radar to carry out a manoeuvre such that is it displaced in the horizontal plane by a displacement having orthogonal components $\Delta x$, $\Delta y$, and measuring the bearing of the jammer at a second position subsequent to the manoeuvre. By making an appropriate choice for the components $\Delta x$, $\Delta y$, the range R may be found with a desired relative range accuracy, and the error in R may be minimized.

3 Claims, 5 Drawing Sheets

(56) References Cited

U.S. PATENT DOCUMENTS

| | | | | |
|---|---|---|---|---|
| 6,417,799 | B1* | 7/2002 | Aubain | G01S 5/12 342/16 |
| 6,510,388 | B1* | 1/2003 | Sporrong | G08G 5/045 342/455 |
| 6,697,008 | B1* | 2/2004 | Sternowski | G01S 5/0284 342/14 |
| 6,771,220 | B1* | 8/2004 | Ashe | G01S 19/21 342/14 |
| 6,839,017 | B1* | 1/2005 | Dillman | G01S 5/04 342/146 |
| 7,427,947 | B1* | 9/2008 | Dark | G01S 7/021 342/13 |
| 7,478,578 | B2* | 1/2009 | Kirkpatrick | F41H 11/02 244/1 R |
| 7,511,657 | B2* | 3/2009 | Dark | G01S 7/021 342/13 |
| 7,515,096 | B2* | 4/2009 | Dark | G01S 7/021 342/13 |
| 7,737,883 | B2* | 6/2010 | Dark | G01S 7/021 342/13 |
| 7,847,723 | B1* | 12/2010 | Dark | G01S 7/021 342/13 |
| 7,893,866 | B2* | 2/2011 | Dark | G01S 7/021 342/13 |
| 8,588,998 | B2* | 11/2013 | Molander | G01S 11/12 244/76 R |
| 2003/0071749 | A1* | 4/2003 | Yu | G01S 7/2813 342/17 |
| 2004/0027257 | A1* | 2/2004 | Yannone | G01S 11/04 340/945 |
| 2007/0210953 | A1* | 9/2007 | Abraham | G08G 5/045 342/29 |
| 2009/0224956 | A1* | 9/2009 | Dark | G01S 7/021 342/13 |

OTHER PUBLICATIONS

J. M. Passerieux et al: "Optimal Observer Maneuver for Bearings-Only Tracking", IEEE Transactions on Aerospace and Electronic Systems, IEEE Service Center, vol. 34, No. 3, Jul. 1, 1998, pp. 777-788, Piscataway, NJ, US, XP002290216, (Twelve (12) pages).

A. Logothetis et al: "Comparison of Suboptimal Strategies for Optimal Own-Ship Maneuvers in Bearings-Only Tracking", Proceedings of the 1998 American Control Conference. ACC (IEEE CAT. No. 98CH36207), vol. 6, Jan. 1, pp. 3334-3338, XP055122391, (Five (5) pages).

* cited by examiner

Fig 1

PRIOR ART

METHOD OF KINEMATIC RANGING

CROSS-REFERENCE TO RELATED APPLICATIONS

This application claims priority under 35 U.S.C. §119 to European application 14 000 178.5, filed Jan. 17, 2014, the entire disclosure of which is herein expressly incorporated by reference.

BACKGROUND AND SUMMARY OF THE INVENTION

Exemplary embodiments of the invention relate to kinematic ranging techniques.

Kinematic ranging per se is a known electronic counter-counter-measure technique, in which the range of a moving airborne jammer may be estimated by use of a radar unit without the need for the unit to actively interrogate the jammer, i.e. the radar unit may work in a passive mode to detect and process the jammer signals. In the specific examples of the invention described below, the radar unit is an airborne detecting radar unit. Kinematic ranging is described for example in "Kinematic Ranging for IRST", SPIE Vol 1950, Acquisition, Tracking and Pointing VII (1993).

Figure 1:
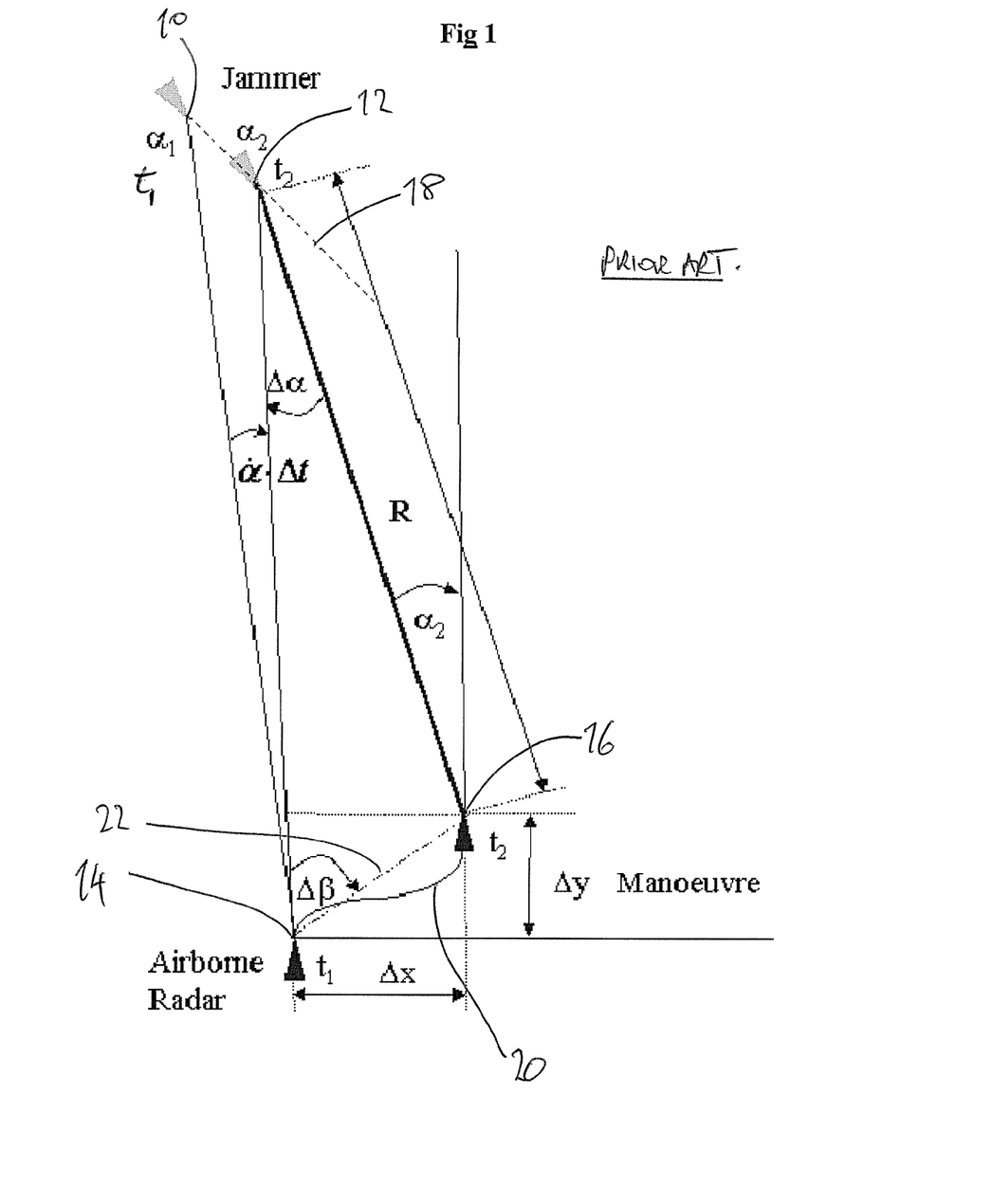
FIG. 1 illustrates a known kinematic ranging technique.

Referring to FIG. 1, in a known kinematic ranging technique, an airborne jammer moves along a trajectory 18 from a first position 10 to a second position 12 in a time interval $\Delta t = t_2 - t_1$, during which an airborne detecting radar unit carries out a manoeuvre along a path 20 from a position 14 to a position 16, corresponding to a displacement 22 defined by displacement components $\Delta x$, $\Delta y$ in the x and y directions respectively. The change $\Delta \alpha$ in azimuth bearing angle of the jammer with respect to the airborne detecting radar unit between the times $t_1$ and $t_2$ is given by $$\Delta \alpha = \alpha_1 + \frac{d\alpha}{dt} \cdot \Delta t - \alpha_2;$$

where $\alpha_1$ and $\alpha_2$ are the bearings in azimuth of the jammer at times $t_1$ and $t_2$ with respect to positions 14 and 16 respectively. The angle $\Delta \beta$ between the straight line connecting positions 14 and 10 and the displacement 22 is given by $$\Delta \beta = \frac{\pi}{2} - \arctan \frac{\Delta y}{\Delta x} - \alpha_1 - \frac{d\alpha}{dt} \cdot \Delta t. \quad \text{(Equation 1)}$$

$\Delta \beta$ is the angle in the azimuthal plane between the straight line joining the position of the airborne detector radar at time $t_1$ and the position of the jammer at $t_2$ and the straight line corresponding to the displacement of the airborne detector radar during the interval $\Delta t$. Using the sine rule, the range R of the jammer from the airborne detecting radar at time $t_2$ is given by $$\frac{R}{\sin \Delta \beta} = \frac{\sqrt{\Delta x^2 + \Delta y^2}}{\sin \Delta \alpha}. \quad \text{(Equation 2)}$$

The range R of the jammer from the second position 16 of the airborne detecting radar may be therefore be calculated by measuring the bearings $\alpha_1$, $\alpha_2$ in azimuth of the jammer at the times $t_1$, $t_2$ with respect to the airborne detecting radar unit, the rate of change $d\alpha/dt$ of the bearing in azimuth of the jammer with respect to the position 14, the components $\Delta x$, $\Delta y$ of the displacement 22 corresponding to the manoeuvre 20 of the airborne detecting radar, and the time interval $\Delta t$.

A disadvantage of the known method of kinematic ranging is that when the airborne detecting radar unit carries out a general manoeuvre 20, corresponding to a general displacement such as 22, the final result for the range R typically involves a significant level of uncertainty as a result of measurement errors associated with the values of $\alpha_1$, $\alpha_2$, $d\alpha/dt$, $\Delta t$, $\Delta x$ and $\Delta y$.

The present invention provides a method of kinematic ranging comprising the steps of:
  (i) measuring the bearing $\alpha_1$ in azimuth of a jammer at a time $t_1$ with respect to a first position using an airborne radar detector located at the first position;
  (ii) measuring the rate of change $d\alpha/dt$ of the bearing in azimuth of the jammer with respect to the first position using the airborne radar detector located at the first position;
  (iii) causing the airborne radar detector to carry out a manoeuvre such that it is displaced to a second position by a horizontal displacement d having orthogonal components $\Delta x$, $\Delta y$ in a time $\Delta t = t_2 - t_1$ and measuring the bearing $\alpha_2$ in azimuth of the jammer at time $t_2$ with respect to the second position using the airborne radar detector located at the second position, where $d = \sqrt{\Delta x^2 + \Delta y^2}$;
  (iv) calculating the difference $\Delta \alpha$ in the bearing in azimuth of the jammer between the second and first positions;
characterised in that the components $\Delta x$, $\Delta y$ are calculated by the steps of:
  (a) choosing a desired relative range accuracy $\sigma_R/R$ for the method;
  (b) obtaining an estimated range $R_{est}$ of the jammer from the second position at time $t_2$;
  (c) finding d on the basis of the relative range accuracy, the estimated range $R_{est}$, the variance $\sigma_{\Delta \alpha}^2$ in $\Delta \alpha$ and the variance $\sigma_d^2$ in d according to $$\sigma_R = \frac{R}{d} \sqrt{(R^2 - d^2) \cdot \sigma_{\Delta \alpha}^2 + \sigma_d^2}$$

(d) calculating the components $\Delta x$, $\Delta y$ of the displacement d according to $$\Delta x = \cos(\alpha_1 + \dot{\alpha} \cdot \Delta t) \cdot d$$

$$\Delta y = -\sin(\alpha_1 + \dot{\alpha} \cdot \Delta t) \cdot d$$

and also characterised in that the range R of the jammer from the second position is calculated according to $$R = \frac{d}{\sin \Delta \alpha}.$$

The invention provides the advantage that the range R may be measured with a desired relative range accuracy by causing the airborne radar detector to carry out the manoeuvre d having the calculated displacement components $\Delta x$, $\Delta y$ in the horizontal plane.

In order to provide the possibility of a further increase in the accuracy of the determined range R, preferably the method further comprises the steps of
  (i) evaluating the angle $\Delta\beta_1$ between the straight line joining the first position of the airborne detector radar and the position of the jammer at time $t_2$, and the straight line defined by the components $\Delta x$, $\Delta y$;
  (ii) evaluating the angle $\Delta\beta_2$ between the straight line joining the first position of the airborne detector radar and the position of the jammer at time $t_2$, and the straight line defined by the components $-\Delta x$, $\Delta y$;
  (iii) if $|\Delta\beta_1-\pi/2|\leq|\Delta\beta_2-\pi/2|$ then choosing the manoeuvre of the airborne detector radar such that its displacement has components $\Delta x$, $\Delta y$ and if $|\Delta\beta_1-\pi/2|>|\Delta\beta_2-\pi/2|$ then choosing the manoeuvre of the airborne detector radar such that its displacement has components $-\Delta x$, $\Delta y$.

In some embodiments, the method may be applied to the simultaneous determination of the range of two jammers, in which case the method preferably further includes the steps of:
  (i) evaluating the angle $\Delta\beta_{11}$ between the straight line joining the first position of the airborne detector radar and the position of the first jammer at time $t_2$, and the straight line defined by the components $\Delta x$, $\Delta y$;
  (ii) evaluating the angle $\Delta\beta_{12}$ between the straight line joining the first position of the airborne detector radar and the position of the second jammer at time $t_2$, and the straight line defined by the components $\Delta x$, $\Delta y$;
  (iii) evaluating the angle $\Delta\beta_{21}$ between the straight line joining the first position of the airborne detector radar and the position of the first jammer at time $t_2$, and the straight line defined by the components $-\Delta x$, $\Delta y$;
  (iv) evaluating the angle $\Delta\beta_{22}$ between the straight line joining the first position of the airborne detector radar and the position of the second jammer at time $t_2$, and the straight line defined by the components $-\Delta x$, $\Delta y$;
  (v) if $|\Delta\beta_{11}+\Delta\beta_{12}-\pi|\leq|\Delta\beta_{21}+\Delta\beta_{22}-\pi|$ then choosing the manoeuvre of the airborne detector radar such that its displacement has components $\Delta x$, $\Delta y$ and if $|\Delta\beta_{11}+\Delta\beta_{12}-\pi|>|\Delta\beta_{21}+\Delta\beta_{22}-\pi|$ then choosing the manoeuvre of the airborne detector radar such that its displacement has components $-\Delta x$, $\Delta y$.

This ensure the greatest overall accuracy in the determined ranges of the two jammers.

BRIEF DESCRIPTION OF THE DRAWING FIGURES

Embodiments of the invention are described below by way of example only, and with reference to the accompanying drawings in which.

DETAILED DESCRIPTION

Using Gauss' law in conjunction with Equation 2, the variance in the range R of the jammer is given by $$\sigma_R^2 = \left(\frac{\partial R}{\partial(\Delta\beta)}\right)^2 \sigma_{\Delta\beta}^2 + \left(\frac{\partial R}{\partial(\Delta\alpha)}\right)^2 \sigma_{\Delta\alpha}^2 + \left(\frac{\partial R}{\partial d}\right)^2 \sigma_d^2 \quad \text{(Equation 3)}$$

where $\sigma^2_{\Delta\beta}$, $\sigma^2_{\Delta\alpha}$, and $\sigma^2_d$ are the variances in the angles $\Delta\beta$, $\Delta\alpha$ and in the displacement d respectively. Inserting the derivatives of Equation 2 into Equation 3 gives an expression for the relative range accuracy $\sigma_R/R$:

$$\frac{\sigma_R^2}{R^2} = \cot^2(\Delta\beta)\sigma_{\Delta\beta}^2 + \frac{\sigma_{\Delta\alpha}^2}{\tan^2(\Delta\alpha)} + \frac{\sigma_d^2}{d^2},$$

which is minimised when $$\cot^2(\Delta\beta)=0$$

and $\Delta\alpha$ and d are as large as possible. $\cot^2(\Delta\beta)=0$ if $\Delta\beta=\pi/2$; combining this with Equation 1 gives $$\arctan\frac{\Delta y}{\Delta x} = -\alpha_1 - \dot{\alpha}\cdot\Delta t$$

or equivalently $$\Delta y = -\tan(\alpha_1 + \dot{\alpha}\cdot\Delta t)\cdot\Delta x$$

For $\Delta\beta=\pi/2$, Equations 2 and 3 can be written as $$R = \frac{d}{\sin(\Delta\alpha)} \quad \text{(Equation 4)}$$

and $$\sigma_R = \frac{R}{d}\sqrt{(R^2-d^2)\cdot\sigma_{\Delta\alpha}^2 + \sigma_d^2}$$

Figure 2:
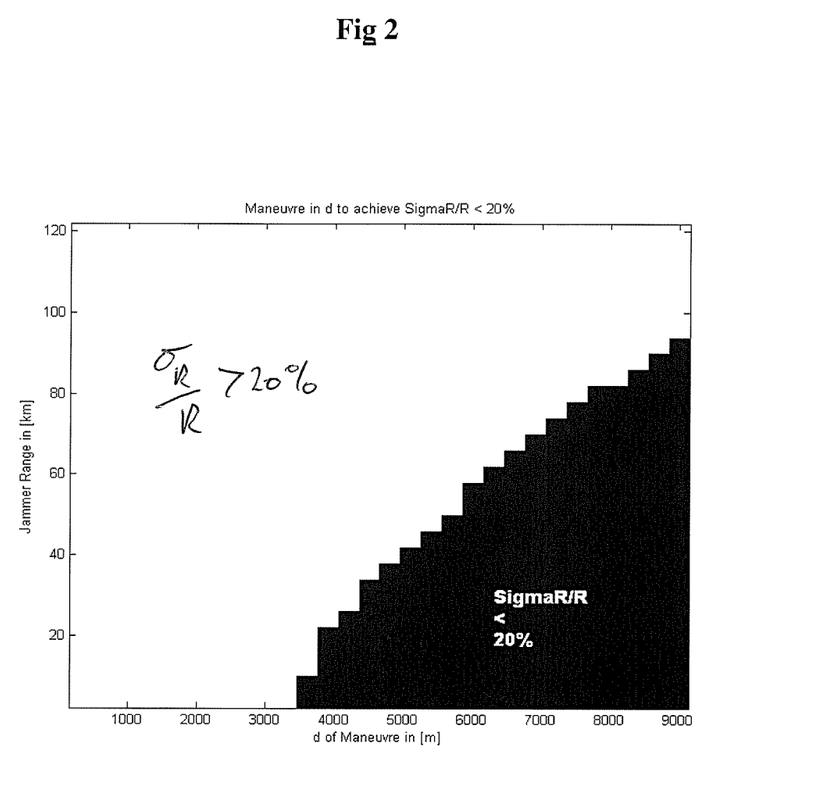
FIG. 2 shows the relationship between the range R of a jammer and the displacement d of a manoeuvre of an airborne radar detector executed in a method of the invention in the case of a relative range accuracy of less than 20%.

FIG. 2 shows a plane through the function of Equation 4 at the value $\sigma_R/R=0.2$ assuming accuracies $\sigma_d$, $\sigma_{\Delta\alpha}$ in the measurement of d and $\Delta\alpha$ of 700 m and 1° respectively. If an initial value of the range R of 70 km is estimated, from FIG. 2 this corresponds to a displacement d of ~7000 m. The values $\alpha_1$, $d\alpha/dt$ are measured when the airborne detector radar is at position 14, as described above with reference to FIG. 1. The time $\Delta t$ taken for the airborne detector radar to carry out the manoeuvre 20 in order to cover the displacement d is d/v+dt where v is the velocity of the radar detector and dt is a tolerance value.

$$\Delta t = \frac{7000 \text{ m}}{250 \text{ m/s}} + 5 \text{ s} = 33 \text{ s}$$

Taking d=7000 m, dt=5 s and v=250 m/s, and assuming that $\alpha_1=-20°$ and $\dot{\alpha}=0.2°/s$, the components $\Delta x$, $\Delta y$ of the displacement d are $$\Delta x = \cos(\alpha_1+\dot{\alpha}\cdot\Delta t)\cdot d = \cos(-20°+6.6°)\cdot d \approx 6810 \text{ m}$$

$$\Delta y = -\sin(\alpha_1+\dot{\alpha}\cdot\Delta t)\cdot d = -\sin(-20°+6.6°)\cdot d \approx 1620 \text{ m}$$

Figure 3:
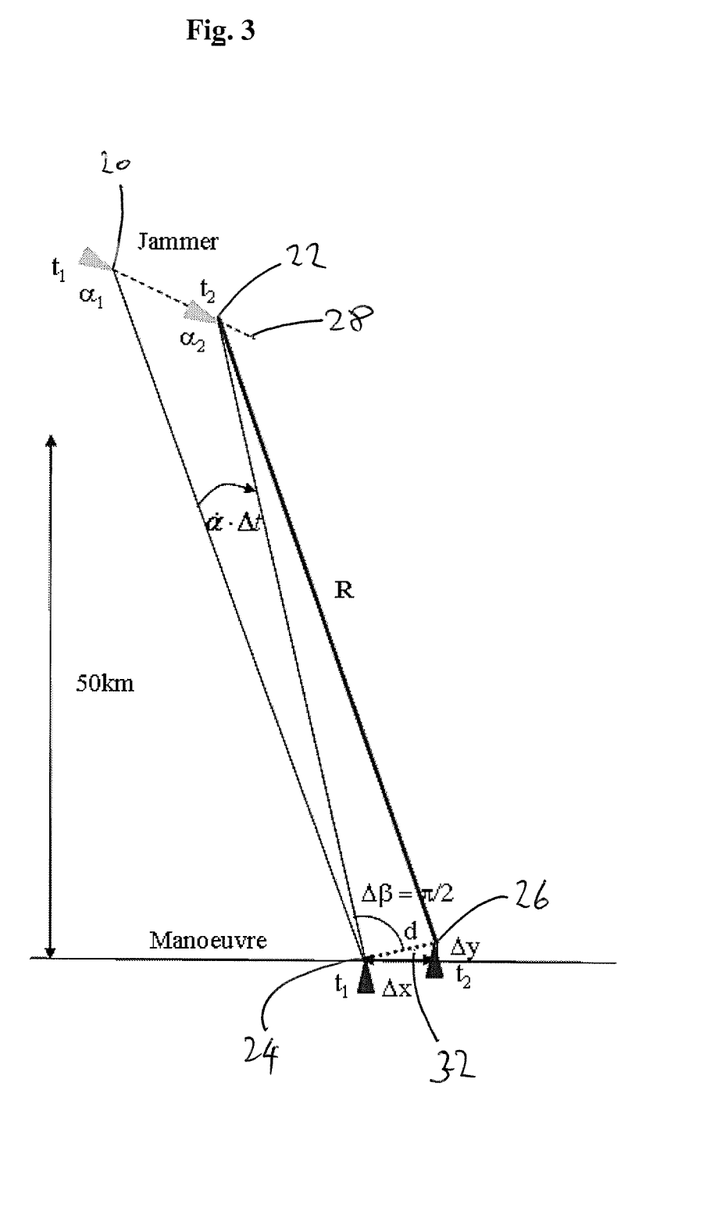
FIG. 3 illustrates the measurement of the range R of a jammer with minimum uncertainty.

If the airborne detector radar carries out the manoeuvre 20 using these components of the displacement d, then the error in the measurement of the range R has a relative range accuracy of 20% or better. FIG. 3 shows the displacement 32 of length d, the angle $\Delta\beta$ being 90° in this case. In FIG. 3, the jammer moves from a position 20 to a position 22 along a trajectory 28 in a time interval Δt, during which the airborne detector radar moves from a position 24 to a position 26, these positions defining the displacement d.

Figure 4:
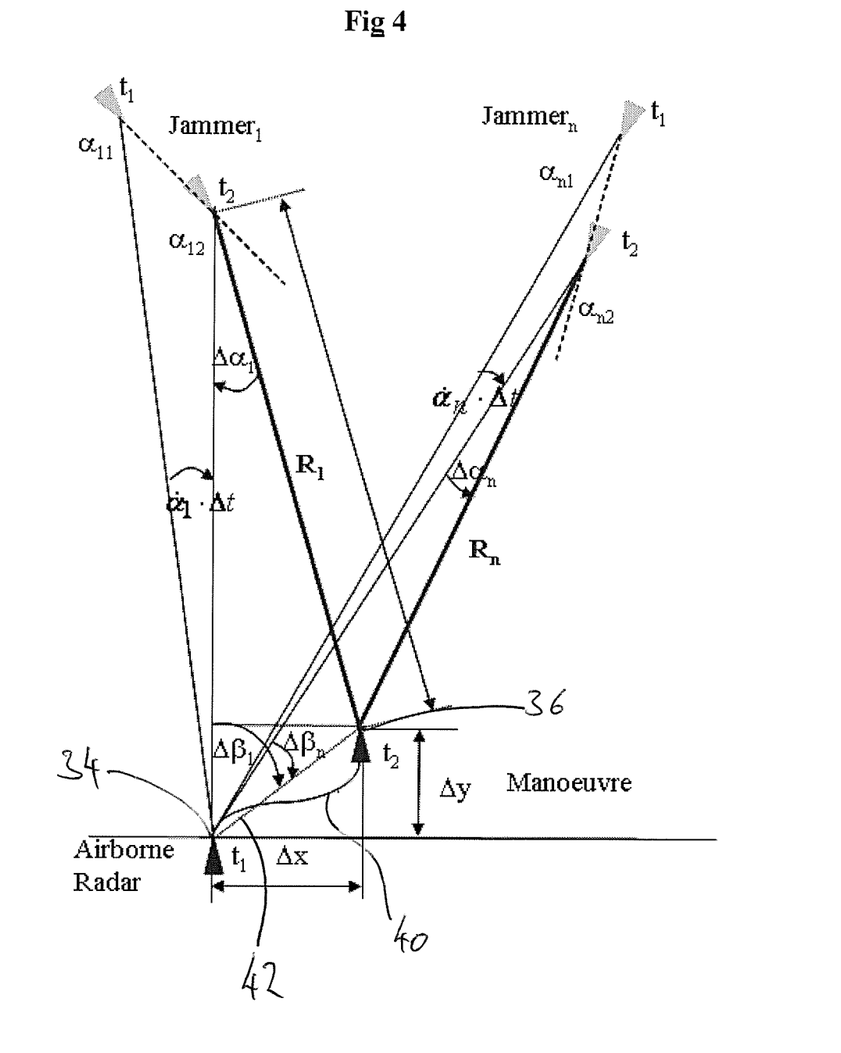
FIG. 4 illustrates a non-optimised manoeuvre of an airborne detector radar for estimating the range of multiple jammers.

FIG. 4 illustrates how the method may be applied to find the range of multiple jammers by increasing the number of manoeuvre s carried out by a detecting airborne radar. In this case, n jammers are located and assessed at time $t_1$ and have bearings in azimuth of $\alpha_{11} \ldots \alpha_{n1}$. The airborne detector radar carries out a manoeuvre on a path 40 from point 34 to the end 36 which define a displacement 42 of length $d=(\Delta x^2+\Delta y^2)^{1/2}$. At time $t_2$ at the position 36, the measured bearings in azimuth of the jammers are $\alpha_{12} \ldots \alpha_{n2}$. The differences in bearing $\Delta\alpha_n$ and the angle $\Delta\beta_n$ are $$\Delta\alpha_n = \alpha_{n1} + \frac{d\alpha_n}{dt} \cdot \Delta t - \alpha_{n2}$$

$$\Delta\beta_n = \frac{\pi}{2} - \arctan\frac{\Delta y}{\Delta x} - \alpha_{n1} - \frac{d\alpha_n}{dt} \cdot \Delta t$$

and the range $R_n$ of the nth jammer is given by $$R_n = \frac{\sin(\Delta\beta_n)\sqrt{\Delta x^2 + \Delta y^2}}{\sin\Delta\alpha_n}.$$

Figure 5:
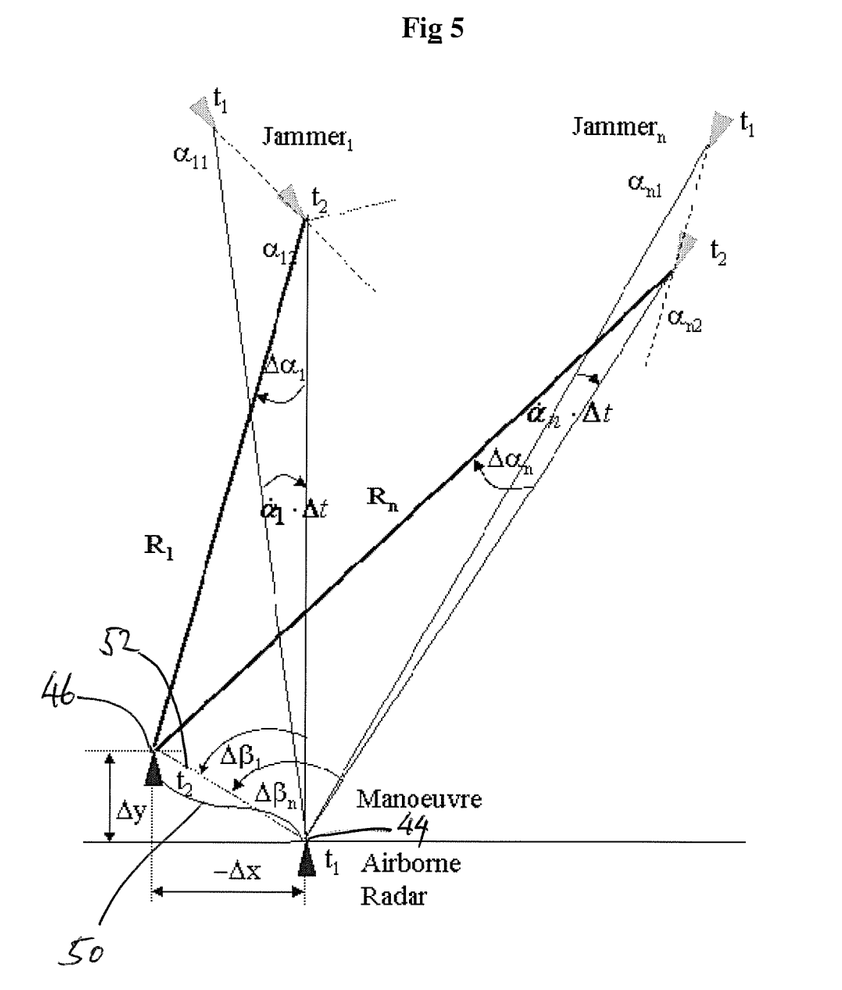
FIG. 5 illustrates an alternative manoeuvre of an airborne detector radar for estimating the ranges of multiple jammers with improved accuracy.

In FIG. 4, the value $\Delta\beta_1$ is approximately 60° which leads to acceptable results, however $\Delta\beta_n$ may become close to zero, so that the relative range accuracy for the measurement of $R_n$ approaches a pole. To avoid this, the manoeuvre of the airborne detector radar may be carried out so that the displacement Δx is negative, as shown in FIG. 5; in this case a displacement 52 between positions 44 and 46 is achieved by a manoeuvre 50. Using this manoeuvre 50, $\Delta\beta_n$ is approximately 90°, so that the error in the range R is minimised, and $\Delta\beta_1$ is approximately 60°, which results in the accuracy of the measurement of $R_1$ also being acceptable. In this example, although the manoeuvre is optimised for jammer 1, the angle velocity dα/dt of jammer 1 increases $\Delta\beta_1$ without lowering $\Delta\beta_n$; this is because both jammers have the same direction of angle velocity dα/dt.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of kinematic ranging comprising the steps of:
(i) measuring a bearing al in azimuth of a jammer at a time $t_1$ with respect to a first position using an airborne radar detector located at a first position;
(ii) measuring a rate of change dα/dt of the bearing in azimuth of the jammer with respect to the first position using the airborne radar detector located at the first position;
(iii) causing the airborne radar detector to carry out a manoeuvre such that it is displaced to a second position by a horizontal displacement d having orthogonal components Δx, Δy in a time $\Delta t=t_2-t_1$ and measuring a bearing $\alpha_2$ in azimuth of the jammer at time $t_2$ with respect to the second position using the airborne radar detector located at the second position, where $d=\sqrt{\Delta x^2+\Delta y^2}$;
(iv) calculating a difference Δα in the bearing in azimuth of the jammer between the second and first positions;
wherein components Δx, Δy are calculated by the steps of
(a) choosing a desired relative range accuracy $\sigma_R/R$ for the method;
(b) obtaining an estimated range $R_{est}$ of the jammer from the second position at time $t_2$;
(c) finding d based on the relative range accuracy, the estimated range $R_{est}$, the variance $\sigma_{\Delta\alpha}^2$ in Δα and the variance $\sigma_d^2$ in d according to $$\sigma_R = \frac{R}{d}\sqrt{(R^2-d^2)\cdot\sigma_{\Delta\alpha}^2 + \sigma_d^2}$$

(d) calculating the components Δx, Δy of the displacement d according to $$\Delta x = \cos(\alpha_1 + \dot{\alpha}\cdot\Delta t)\cdot d$$

$$\Delta y = -\sin(\alpha_1 + \dot{\alpha}\cdot\Delta t)\cdot d$$

wherein a range R of the jammer from the second position is calculated according to $$R = \frac{d}{\sin\Delta\alpha}.$$

2. The method of claim 1, further comprising the steps of:
(i) evaluating an angle $\Delta\beta_1$ between a straight line joining the first position of the airborne detector radar and the position of the jammer at time $t_2$, and a straight line defined by the components Δx, Δy;
(ii) evaluating an angle $\Delta\beta_2$ between the straight line joining the first position of the airborne detector radar and the position of the jammer at time $t_2$, and a straight line defined by the components −Δx, Δy;
(iii) if $|\Delta\beta_1-\pi/2|\leq|\Delta\beta_2-\pi/2|$ then choosing the manoeuvre of the airborne detector radar such that the airborne detector radar's displacement has components Δx, Δy and if $|\Delta\beta_1-\pi/2|>|\Delta\beta_2-\pi/2|$ then choosing the manoeuvre of the airborne detector radar such that the airborne detector radar's displacement has components −Δx, Δy.

3. The method according to claim 1, wherein a range of a second jammer is also determined, and wherein the method comprises the steps of:
(i) evaluating an angle $\Delta\beta_{11}$ between a straight line joining the first position of the airborne detector radar and the position of the first jammer at time $t_2$, and a straight line defined by the components Δx, Δy;
(ii) evaluating an angle $\Delta\beta_{12}$ between a straight line joining the first position of the airborne detector radar and the position of the second jammer at time $t_2$, and the straight line defined by the components Δx, Δy;
(iii) evaluating an angle $\Delta\beta_{21}$ between the straight line joining the first position of the airborne detector radar and the position of the first jammer at time $t_2$, and a straight line defined by the components −Δx, Δy;
(iv) evaluating an angle $\Delta\beta_{22}$ between the straight line joining the first position of the airborne detector radar and the position of the second jammer at time $t_2$, and the straight line defined by the components −x, −y;
(v) if $|\Delta\beta_{11}+\Delta\beta_{12}-\pi|\leq|\Delta\beta_{21}+\Delta\beta_{22}-\pi|$ then choosing the manoeuvre of the airborne detector radar such that the airborne detector radar's displacement has components Δx, Δy and if $|\Delta\beta_{11}+\Delta\beta_{12}-\pi|>|\Delta\beta_{21}+\Delta\beta_{22}-\pi|$ then choosing the v of the airborne detector radar such that the airborne detector radar's displacement has components $-\Delta x, \Delta y$.

\* \* \* \* \*